United States Patent Office 2,711,422
Patented June 21, 1955

2,711,422

CYANOHYDRIN COMPOUNDS OF THE DICYCLOHEXANE ETHANE SERIES, AND A PROCESS OF MAKING SAME

Erich M. H. Radde, New York, N. Y.

No Drawing. Application November 20, 1953,
Serial No. 393,505

Claims priority, application Germany November 2, 1949

4 Claims. (Cl. 260—464)

This invention relates to dicyclohexyl ethane compounds, and more particularly to dicyclohexyl ethane compounds substituted by alkyl residues, and a method of producing same.

The present invention is a continuation-in-part application of my co-pending application Serial No. 193,275, filed October 31, 1950, now Patent No. 2,661,369, relating to "Dicyclohexyl ethane compounds and a method of making same." Said copending application refers to (p-cyclohexenonyl)-(p-hydroxy aceto cyclohexanyl)-diethyl ethane compounds of the following formula

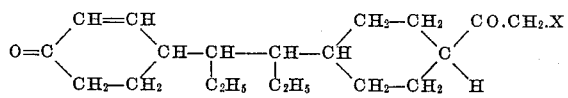

wherein X represents a member selected from the group consisting of a hydroxyl group and an acyloxy group.

It is one object of this invention to provide new chemical compounds of the following formula

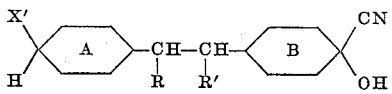

wherein R and R′ are alkyl radicals and espectially ethyl radicals while X′ represents a secondary alcohol group or a group convertible by hydrolysis into said secondary alcohol group, especially an ester group. The cyclohexyl nuclei A and B may be saturated but they may also contain a double bond.

A further object of this invention is to provide methods for producing said compounds by using compounds of the following formula as starting materials:

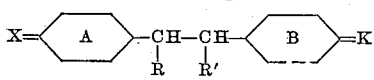

is a keto or secondary alcohol group or a group convertible thereinto wherein X,/R, and R′ indicate the same groups as stated above and K is a keto group, while rings A and/or B may contain double bonds. Such starting materials are described, for instance, in French Patent 872,058 which relates to hydroxy ketones or diketones respectively of dicyclohexane dialkyl ethane compounds which are derived from the corresponding dialkyl stilbestrol compounds.

Other objects of this invention will be apparent from the specification and the claims attached thereto.

Said new nitriles can be converted, for instance, into compounds having the activity of the corpus luteum hormone for instance by converting a (p-acyloxy cyclohexanyl) (p-cyclohexanonyl) diethyl ethane, as they can be produced according to Examples 8 or 10 of French Patent 872,058, into the new cyanohydrin, splitting off water from the tertiary hydroxyl group and the neighboring methylene group in said cyanohydrin, reacting the dehydronitrile with Grignard reagent so as to form the aceto cyclohexene compound, hydrogenating the double bond, oxidizing the hydroxyl group to the keto group, introducing bromine into the ketonic cyclohexane ring of the compound, and splitting off hydrogen bromide from said bromo compound. The resulting (cyclohexenonyl) (p-acetocyclohexanyl) diethyl ethane has the activity of the corpus luteum hormone. This reaction is described more in detail in my co-pending application Serial No. 393,501, filed November 20, 1953, entitled "(p-Acetocyclohexanyl) (p-cyclohexenonyl) diethyl ethane compounds, and a process of making same" which is also a continuation-in-part application of my above mentioned copending application Serial No. 193,275, now Patent No. 2,661,369.

As can be seen from the foregoing, the preesnt invention consists in principle in subjecting the starting material which has one free keto group, to reactions as they are known to the art and espectially in steroid hormone chemistry, whereby cyanohydrin groups are introduced inot the molecule.

The following examples serve to illustrate the invention, without, however, limiting the same thereto.

Example 1

25 g. of (p-acetoxy cyclohexanyl) (p-cyclohexanonyl) diethyl ethane obtained, for instance, according to French Patent 872,058, Examples 8 or 10, are heated with 100 g. of anhydrous hydrocyanic acid in an autoclave for about 4 hours at 50° C. Thereafter the unreacted hydrocyanic acid is evaporated and the cyanohydrin obtained is purified by recrystallisation from ethanol.

10 g. of said cyanohydrin are heated with 50 cc. of a solution of 3.0 g. sodium hydroxide in ethanol and 50 cc. of water in a sealed glass tube for 2 hours at 180° C., the reaction mixture is poured into water, acidified with dilute sulfuric acid, and the precipitated hydroxy carboxylic acid is separated.

10 g. of said acid are then allowed to stand at 20° C. with 40 cc. of dry pyridin and 40 cc. of acetic acid anhydride for 24 hours, the reaction mixture is poured in water, the precipitated monoacetate is washed with water, and is several times recrystallized from alcohol.

In order to split off water between the tertiary hydroxyl group and the neighboring methylene radical 5 g. of said monoacetate are heated under reflux with 25 cc. of pyridine and 2.5 g. of phosphorous oxychloride for half an hour, the reaction mixture is then poured into a mixture of ice and hydrochloric acid, the acid mixture is extracted with ether and the residue obtained is purified by crystallisation from aqueous acetone.

5 g. of said unsaturated acid are dissolved in 250 cc. of ethyl acetate and are then hydrogenated in a shaking apparatus with hydrogen in the presence of a palladium-calcium carbonate catalyst. After filtering off the catalyst the solvent is distilled off and the remaining saturated acid is purified by crystallisation from alcohol or any other suitable solvent.

5 g. of the saturated acid are boiled under reflux in 25 cc. of anhydrous benzene with 25 cc. of purest thionyl chloride for 3 hours, whereby care is taken that moisture is excluded. Thereafter the benzene as well as the excess of thionyl chloride are distilled off in a vacuum.

The remaining acid chloride is dissolved in 50 cc. of anhydrous ether and the solution is poured into 50 cc. of an anhydrous ethereal diazomethane solution containing 5 g. of freshly prepared diazomethane, said solution being cooled to —10° C. Within the next 2 hours the temperature is gradually raised to room temperature and the solution is allowed to stand over night. After filtration, the filtrate is evaporated almost to dryness in vacuo and the diazoketone formed is precipitated from its concentrated ethereal solution by the addition of petrol ether.

The precipitated diazoketone is then dissolved in 100 cc. of methanol and the solution mixed with 50 cc. of a 5% methanolic potassium hydroxide solution. The mixture is allowed to stand over night, water is added, the methanol is evaporated in vacuo, and the remaining saponified diazoketone is dissolved in ether. After drying the ethereal solution, the ether is removed by evaporation from a water bath and finally by vacuum distillation.

The diazoketone is then heated with 20 cc. of glacial acetic acid to 90° C., until no more nitrogen is developed. On cooling the corresponding hydroxy ketone is obtained.

2 g. of the same are allowed to stand over night with a solution of 1.5 g. of chromium trioxide in 95 cc. of glacial acetic acid and 5 cc. of water. The reaction mixture is poured into much water and is extracted several times with ether.

The (acetoxy acetocyclohexanyl)(cyclohexanonyl) diethyl ethane obtained after evaporation of the ether is then dissolved in 30 times its amount of chloroform.

To said solution a solution of bromine in chloroform is added drop by drop while stirring vigorously and cooling between −8° C. to −12° C. until 1 molecule of bromine has reacted to form the monobromo compound. The chloroform solution is washed with sodium bicarbonate solution and with water until neutral, is dried by means of sodium sulfate, and is subjected to vacuum distillation to remove the chloroform.

The residue is then boiled with 5 times its amount of dry pyridine for about 6 hours. The pyridine is distilled off in vacuum and the residue dissolved in ether. The ethereal solution is washed with dilute sulfuric acid, with sodium bicarbonate solution, and with water until neutral, and is dried with sodium sulfate. The ether is distilled off and the residue is purified by fractional distillation in a high vacuum. The (cyclohexenonyl)(acetoxyacetocyclohexanyl) diethyl ethane obtained has a corticosterone-like activity.

*Example 2*

20 g. of (p-acetoxycyclohexanyl)(p-cyclohexanonyl) diethyl ethane obtained according to French Patent No. 872,058, Example 8 or 10, are dissolved in 250 cc. of 96% ethyl alcohol. 40 g. of potassium cyanide and thereafter 50 g. of glacial acetic acid are added to said alcoholic solution while stirring. The reaction mixture is heated to boiling under reflux and is kept boiling for 2 hours, thereby stirring continuously. The solution is cooled to room temperature and is then poured into 500 cc. of chloroform. After addition of 1000 cc. of water the mixture is stirred and the chloroform extract separated from the aqueous solution. The latter is again extracted in the same manner twice with 200 cc. of chloroform and once with 150 cc. of chloroform. The chloroform extract is washed with water, 3% hydrochloric acid, and again acid-free with water and the chloroform is then distilled off in a vacuum. The cyanohydrin obtained may be further purified but it can be used as such for the next step.

44 g. of crude cyanohydrin are dissolved in 350 cc. of pure pyridine at room temperature. 35 cc. of pure phosphorus oxychloride are added to said solution and the reaction mixture is heated to boiling under reflux for about 4 hours. It is then cooled to room temperature, and poured upon a mixture of 1000 cc. of water containing about 400 g. of ice and 400 cc. of conc. hydrochloric acid while stirring vigorously. The dehydronitril precipitated is then dissolved in about 1000 cc. of acetone while stirring and heating under reflux. After filtering, the acetone is partly distilled off and then cooled until the dehydronitril precipitates. The precipitate may be purified by redissolving and recrystallisation from aqueous acetone.

Methylbromide is passed into 250 cc. of dry ether with 24 g. magnesium chips to which a few iodine crystals have been given. As soon as the absorption of methylbromide stops, i. e. as soon as about 125 g. of methylbromide are consumed and all the magnesium has reacted, a solution of 20 g. of dehydronitril in 200 cc. of anisol is run into said Grignard reagent solution. The reaction mixture is then heated for about 4–5 hours to about 60° C. while stirring, and is cooled to room temperature. It is thereafter added drop by drop, while stirring and cooling, to 1000 cc. of 50% acetic acid and then heated to remove part of the ether and anisol. The remainder is distilled off by steam distillation until all the anisol is removed. 400 cc. of hydrochloric acid 1:1 are then added and the acidified mixture is extracted several times with 200 cc. of chloroform each time. The combined chloroform extracts are washed with hydrochloric acid 1:1, with water, with 3% sodium hydroxide and again with water. The washed neutral chloroform extract is then evaporated to dryness. The dehydroacetohexahydrophenone obtained may be purified by recrystallisation from methanol.

13 g. of said dehydroacetohexahydrophenone are then hydrogenated in 650 cc. of methanol in the presence of 15 g. Raney nickel catalyst by passing hydrogen through said methanolic solution while shaking the reaction flask. As soon as the reduction of the double bond is completed, the methanol solution is separated from the catalyst which is washed with methanol and is kept under water until disposal. The methanol solution is then evaporated to dryness and the acetohexahydrophenone obtained recrystallized from acetone and if necessary purified over its semicarbazone. This is obtained by dissolving 10 g. of the crude product in 75 cc. of methanol while boiling under reflux. To the boiling solution there is added a solution of 6.5 g. of semicarbazide hydrochloride, and 10 g. of crystalline sodium acetate in 80 cc. of methanol and the boiling is continued for about 1 hour. After cooling the semicarbazone obtained is filtered off by suction and washed with methanol. The decomposition of said semicarbazone is carried out by heating the same in a mixture of 4 parts of methanol and 1 part of ether with 10 times its amount of 45% sulfuric acid for 1½ hours, pouring into water, filtering, and washing. The (p-hydroxycyclohexane) (p-acetocyclohexane)-diethyl ethane obtained may be further purified by recrystallisation from acetone.

50 g. of said acetocyclohexane compound are dissolved in 2000 cc. of dry toluene and are heated to boiling with 275 cc. of cyclohexanone. 22 g. aluminum isopropylate dissolved in about 100 cc. of toluene are then added thereto and the reaction mixture is kept boiling for about ½ hour. 125 cc. of water are added and the mixture is steam distilled in order to remove the toluene and the cyclohexanone and cyclohexanol. The aluminum hydroxide sludge is filtered off, washed with water and dried. It is then extracted, in a Soxhlet apparatus, with acetic acid ethyl ester. The extract is evaporated to dryness and the diketone obtained is recrystallized from acetic acid ethyl ester.

10 g. of said diketone are dissolved in 300 cc. of chloroform. To said solution a solution of bromine in chloroform is added drop by drop while stirring and cooling between about −5° C. to −10° C. until 1 molecule of bromine has reacted to form the monobromo compound. The chloroform solution is washed with sodium bicarbonate solution and with water until it is neutral, is dried by means of sodium sulfate, and the chloroform is then distilled off by vacuum distillation.

The crude bromo compound is boiled under reflux with 75 cc. of dry pyridine for about 6 hours. The pyridine is removed by vacuum distillation and the residue dissolved in ether. The ethereal solution is washed with dilute sulfuric acid, with sodium bicarbonate solution, and with water, and is dried with sodium sulfate. The residue remaining after evaporation of the ether, is distilled in a high vacuum or is purified by chromatographic absorption over aluminum oxide and elution by means of petrol ether or benzene or any other suitable solvent. A (cyclohexenone) (acetocyclohexane) diethyl ethane is obtained which has the activity of the corpus luteum hormone and can be further purified by means of its semi-carbazone.

Of course, many changes and variations may be made by those skilled in the art in the reaction conditions, the reagents used, the methods of purifying the reaction products, and the like, in accordance with the principles set forth herein and in the claims annexed hereto. Thus, for instance, instead of the acetyl compounds, esters with other acids such as propionic acid, benzoic acid, phosphoric acid, stearic acid and others, or ethers, such as the methyl ether and others may be used as starting or intermediate compounds or may be produced as final products. The oxidation of the secondary alcohol group to the keto group may be carried out with other oxidizing agents instead of chromic acid, such as with permanganate, by the Meerwein-Ponndorf reaction and the like. The double bond in conjugation to the keto group may be introduced by other known means; for instance, splitting out of hydrogen bromide may be effected by means of dimethyl aniline, quinoline, and others. The addition of hydrocyanic acid to the cyclohexanone compound may be carried out in any other known manner. Splitting out water between the tertiary alcohol group and a neighboring methylene group in a cyclohexanolyl ring which contains a further substituent on the carbon atom carrying the tertiary alcohol group, may be effected by other means, as acetylchloride in acetic acid anhydride and others. Other catalysts than those mentioned, may be employed for hydrogenating the double bond produced on splitting out water between said tertiary hydroxyl group and the neighboring methylene group, for instance, platinum catalysts, or said hydrogenation may be carried out by chemical means. The ketonic intermediate and end products may be purified not only by fractional crystallisation from suitable solvents, but also by converting them into insoluble ketonic condensation products, for instance, with thiosemicarbazide, phenylhydrazine and others, besides those mentioned in the examples. The keto compound may be reformed from said ketonic derivatives not only by hydrolysis by means of acids and the like, but also by reacting said derivatives with other aldehydes or ketones, such as benzaldehyde and others.

The new cyanohydrin and nitrile compounds, as is evident from the examples, are valuable intermediates in the manufacture of corresponding aceto and hydroxy aceto compounds which possess corpus luteum hormone or adreno-cortical hormone activity. They may be used for working up to such compounds in the form of their esters and ethers whereby ester and ether residues are employed as they are conventionally used in steroid chemistry, such as those mentioned in the specification. The free hydroxy nitriles or hydroxy cyanohydrins are obtained from such esters or ethers by hydrolysis by means of known hydrolyzing agents whereby, of course, care must be taken that the cyanohydrin group or the nitrile group are not split off or also hydrolyzed to the carboxyl group. In general, such conversion into the free hydroxy compounds is not necessary for carrying out further reactions with the cyanohydrins or nitriles.

What I claim is:

1. (p-Acetoxycyclohexanyl)(p-nitrilo cyclohexanolyl) diethyl ethane of the following formula

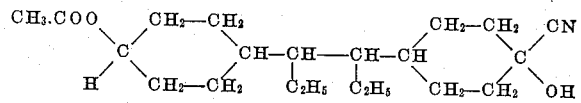

2. (p-Acetoxy cyclohexanyl)(p-nitrilo cyclohexenyl) diethyl ethane of the following formula

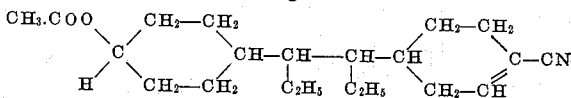

3. A (p-cyclohexanolyl)(p-nitrilo cyclohexanolyl) diethyl ethane compound of the following formula

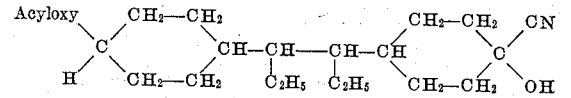

4. A (p-cyclohexanolyl)(p-nitrilo cyclohexenyl) diethyl ethane compound of the following formula

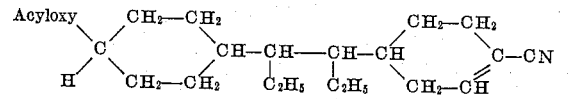

No references cited.